US011148698B2

(12) United States Patent
Rendall et al.

(10) Patent No.: US 11,148,698 B2
(45) Date of Patent: Oct. 19, 2021

(54) MATERIALS HANDLING CART

(71) Applicant: Clearpath Robotics Inc., Kitchener (CA)

(72) Inventors: Matthew Allen Rendall, Waterloo (CA); Daniel Cantor, Waterloo (CA); David William Bergsma, Brampton (CA); Scott Waters, Hollis, NH (US)

(73) Assignee: Clearpath Robotics Inc., Kitchener (CA)

( * ) Notice: Subject to any disclaimer, the term of this patent is extended or adjusted under 35 U.S.C. 154(b) by 0 days.

(21) Appl. No.: 16/546,765

(22) Filed: Aug. 21, 2019

(65) Prior Publication Data
US 2020/0070866 A1 Mar. 5, 2020

Related U.S. Application Data

(60) Provisional application No. 62/720,854, filed on Aug. 21, 2018, provisional application No. 62/777,821, filed on Dec. 11, 2018.

(51) Int. Cl.
B62B 5/06 (2006.01)
B62B 3/14 (2006.01)
B62B 5/04 (2006.01)

(52) U.S. Cl.
CPC .............. B62B 5/06 (2013.01); B62B 3/1492 (2013.01); B62B 5/0457 (2013.01); B62B 2301/0467 (2013.01)

(58) Field of Classification Search
CPC ........ B62B 5/06; B62B 3/1492; B62B 5/0457
See application file for complete search history.

(56) References Cited

U.S. PATENT DOCUMENTS

| 4,700,968 | A | | 10/1987 | Cherry | |
|---|---|---|---|---|---|
| 4,730,685 | A | | 3/1988 | Sinkkonen | |
| 4,817,747 | A | | 4/1989 | Kopczynski | |
| 5,046,748 | A | * | 9/1991 | Oat-Judge | B62B 5/049 280/47.34 |
| 5,332,052 | A | | 7/1994 | Carnevale | |
| 5,526,890 | A | | 6/1996 | Kadowaki | |
| 5,915,706 | A | * | 6/1999 | Mosley | B62B 1/20 280/47.26 |
| 2004/0164505 | A1 | | 8/2004 | Clemens et al. | |
| 2007/0119635 | A1 | | 5/2007 | Lee et al. | |

(Continued)

Primary Examiner — John D Walters
Assistant Examiner — James J Triggs
(74) Attorney, Agent, or Firm — Bereskin & Parr LLP/S.E.N.C.R.L., S.r.l.

(57) ABSTRACT

Systems and methods for transporting objects using a cart that is driven by human action or self-driving vehicle is disclosed. The cart system and method comprises a chassis portion supporting a payload to be moved by the cart. The cart system further comprises of a first side rail and a second side rail. A first front wheel and first rear wheel is attached to the first side rail and a second front wheel and second rear wheel is attached to the second rail. The handle portion pushes the cart which comprises of a handle bar supported by vertical support members. The brake actuator is used to engage and release the brakes on the rear wheel. A horizontal engagement bar is used which comprises of a plurality of engagement pads. A payload-bearing surface bears payload such that the payload can be transported by the cart.

24 Claims, 11 Drawing Sheets

(56) References Cited

U.S. PATENT DOCUMENTS

| | | | |
|---|---|---|---|
| 2008/0178429 A1* | 7/2008 | Haselsteiner | B60B 33/0049 16/35 R |
| 2013/0049311 A1* | 2/2013 | Metters | B62B 3/027 280/33.998 |
| 2013/0054126 A1 | 2/2013 | Lazzari | |
| 2015/0091262 A1 | 4/2015 | Bekoscke et al. | |
| 2017/0144502 A1 | 5/2017 | Bae et al. | |
| 2018/0370377 A1* | 12/2018 | Blacksberg | G05D 1/0231 |

* cited by examiner

MATERIALS HANDLING CART

RELATED APPLICATIONS

This application claims the benefit of U.S. Provisional Application No. 62/720,854 titled "MATERIALS HANDLING CART" filed Aug. 21, 2018 and U.S. Provisional Application No. 62/777,821 titled "MATERIALS HANDLING CART" filed on Dec. 11, 2018. The disclosure of each of U.S. Provisional Application No. 62/720,854 and U.S. Provisional Application No. 62/777,821 is incorporated herein by reference.

TECHNICAL FIELD

The present invention relates in general to cart-based materials transporting systems, and more particularly to system and method for a materials handling cart.

BACKGROUND

A cart is a vehicle designed for transport, using two wheels and normally pulled by one or a pair of draught animals. A handcart is pushed or pulled by one or more people. Over time, "cart" has come to mean nearly any small conveyance, from shopping carts to golf carts or utility task vehicles, without regard to number of wheels, load carried, or means of propulsion.

Prior materials transporting systems and methods suggest the use of hand push carts for moving the cart used for transporting the materials. The use of hand push carts to transport loads instead of carrying them saves a lot of efforts done by workers. It decreases the risk of overexertion injury in jobs that include manual materials handling. More recently, self driving vehicles have been introduced as an automated means for materials handling.

However, the use of self-driving vehicles for materials handling is not compatible with more traditional human-operated materials handling, since human operators and self-driving vehicles have different interfaces, constraints, and preferences when it comes to transporting materials. As such, there is no single solution that allows for materials to be transported on a cart by either a self-driving vehicle or a human operator.

In order to overcome the above aforementioned problems, there is a strong need and demand for a low-cost, easy to manufacture cart for transporting materials within a factory or warehouse, which could be transported by the existing self-driving materials transport vehicles as well as by human operators.

SUMMARY

The present invention overcomes the above problem by providing a system as well as a method for transporting objects using a cart which is driven by human action or self-driving vehicle.

In view of the foregoing, an embodiment herein provides cart system architecture for transporting objects. The cart is driven by human action or self-driving vehicle. The cart comprises of a chassis portion which allows self-driving vehicle to drive under the cart. The horizontal engagement bar (or, more generally, a lift point) is positioned longitudinally so that the self-driving vehicle can engage and lift the cart so that only the rear wheels of the cart are lifted off the ground (i.e. not the front wheels). Rear wheels can be locked with a hand brake. Thus, a human operator can push the cart, carrying a payload, to a first destination, stop, and lock the wheels. Then, the self-driving vehicle can drive to the first location, engage with the cart, lift the rear wheels off the ground.

In one of the embodiment, the system comprises of rear vertical wheel posts or horizontal engagement bar which may include a non-reflective coating in order to make the cart more "visible" to the self-driving vehicles LiDAR sensors. The wheel-break lever is integrated into the push handle so that the wheels are unlocked when the handle is pushed by a human. The handle can be easily removed so that the carts can be "nested" for easier storage and shipment. The cart is made primarily of metal tubing due to which it is easy to manufacture and cost benefits are provided.

In one of the embodiment, the cart includes a brake lever, then the human operator may actuate the brake lever in order to release the lock on the rear wheels, thereby allowing the cart to be pushed. The human operator may push the cart to a second location. At the second location, the human operator may release the brake lever, thereby engaging the wheel locks. The cart-engagement attachment may detect that the cart has become disengaged, for example, using the sensors. A signal can then be sent, for example to a fleet-management system, to notify the system and a human operator that the cart has become disengaged.

According to some embodiments, a self-driving vehicle may be equipped with a lift and/or cart-engagement attachment. The vehicle itself may have a lift and/or the cart-engagement attachment may include a lift. The lift may enable the vehicle to lift the cart at a lift point, such as the engagement bar by the height such that only the rear wheels are lifted off the ground. For example, if the rear wheels include a wheel lock, then the cart can be moved the vehicle when the rear wheels are locked, since the rear wheels are lifted off the ground.

According to some embodiments, the cart-engagement attachment may include one or more sensors for detecting when the cart has been engaged with the vehicle. The sensors may be proximity sensors, such as capacitive and inductive sensors.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practised and to further enable those of skill in the art to practice the embodiments herein. Accordingly, the examples should not be construed as limiting the scope of the embodiments herein.

The embodiments herein achieve this by providing a system as well as a method for transporting objects using materials handling cart which is driven by human action or self-driving vehicle.

Figure 1:
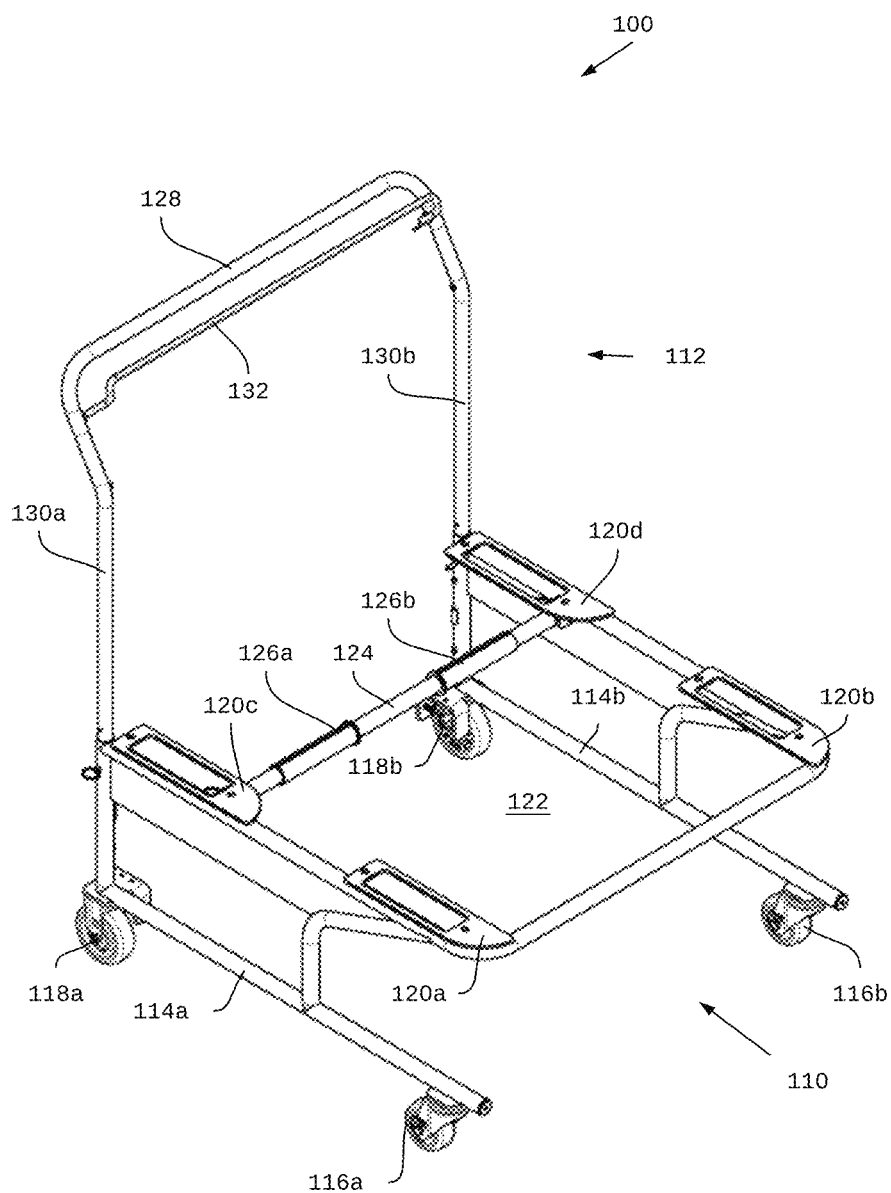
FIG. 1 illustrates the materials handling cart driven by a self driving vehicle for transporting objects.

FIG. 1 is an illustration of the materials handling cart (100) driven by a self driving vehicle for transporting objects. The cart (100) mainly comprises of a chassis portion (110) and a handle portion (112). The chassis portion (110) is used for supporting a payload to be moved by the cart (100). The handle portion (112) is used for pushing the cart (100) by a human operator. The shape of the chassis portion (110) allows for a self-driving vehicle to drive under, or in to, or otherwise engage with the cart (100). According to some embodiments, the chassis portion (110) may include a first side rail (114a) and a second side rail (114b). Each side rail contains two or more wheels (e.g. castors). The cart (100) may comprise of a first front wheel (116a) and a first rear wheel (118a) attached to the first side rail (114a). Similarly, a second front wheel (116b) and a second rear wheel (118b) may be attached to the second side 124 rail (114b). According to some embodiments, the front wheels may be castors for allowing the front of the cart to pivot and turn. The rear wheels may include a locking mechanism for fixing the angular position of the wheels. The chassis portion (110) comprises a plurality of support surfaces (120a, 120b, 120c & 120d) that collectively define a payload-bearing surface (122). A payload such as a pallet, skid, box, container, etc. can be placed on the payload-bearing surface (122) such that the payload can be transported by the cart (100). The chassis portion (110) comprises one or more lift points, as represented by the horizontal engagement bar (124). The handle portion (112) comprises a handle bar (128) supported by plurality of vertical support members (130a) and (130b) and a brake actuator (132) for engaging and releasing the breaks on the rear wheels.

Figure 2:
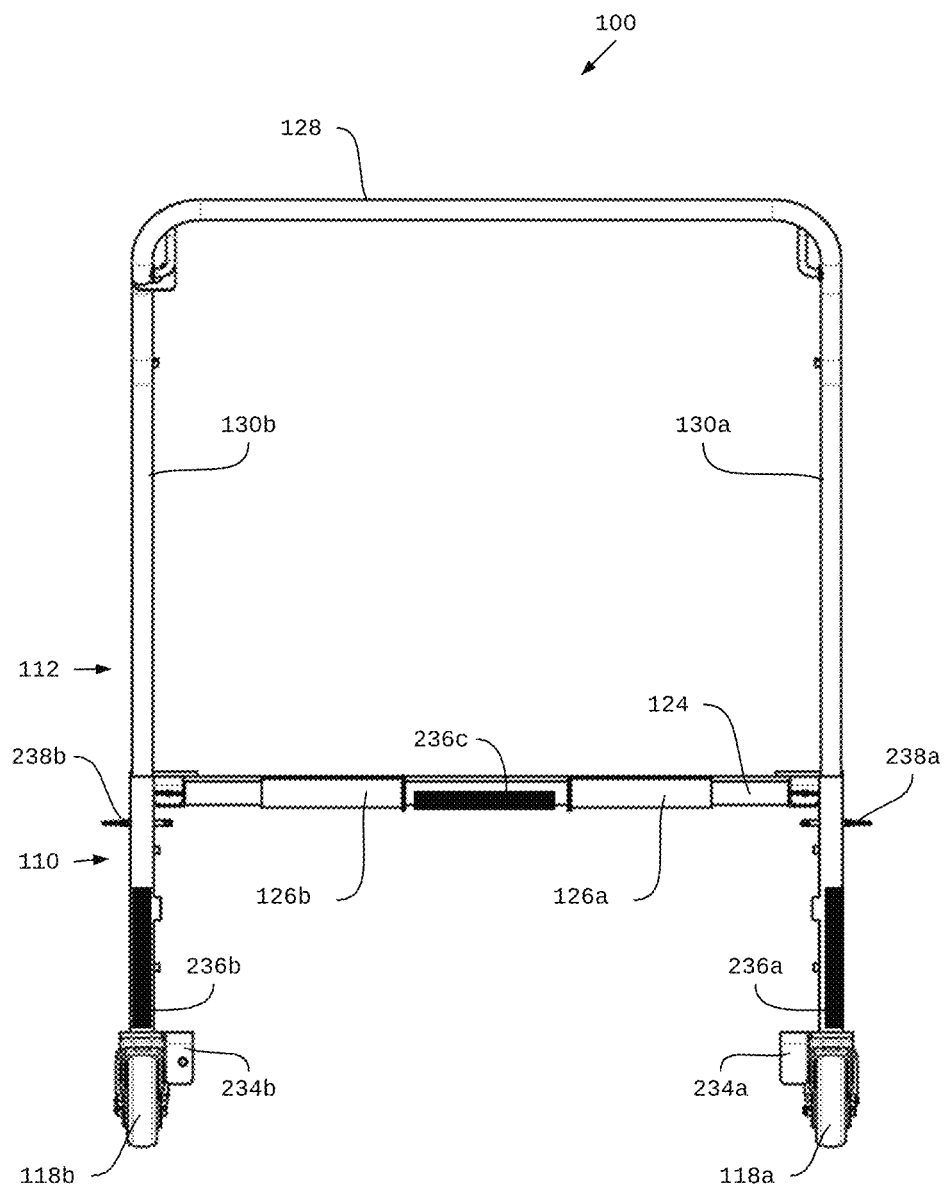
FIG. 2 illustrates the materials handling cart in an elevating position seen from the rear portion of the cart.

FIG. 2 is an illustration of materials handling cart (100) seen from the rear portion of the cart (100). As used herein, "rear" refers to the back portion of the cart, for example, the portion to which the handle portion 112 is attached as shown, and "rearward" refers to approaching in the direction the rear part of the cart (in other words "from behind"). The horizontal engagement bar (124) may comprise one or more engagement pads (126a) and (126b). The engagement pads (126a) and (126b) may be selected such that they are complementary with (or otherwise engage with) a cart (100) interface on a self-driving vehicle. The cart (100) may comprise target surfaces (236a-236c). The target surfaces (236a-236c) may be selected to have optical qualities that make the target surfaces (236a-236c) easily detectable by a light detection and ranging device or other optical range-finding or time-of-flight sensors. The cart (100) is made using steel tubing. The handle portion (112) is removable in order to allow for a plurality of carts to be stacked or nested. For example, removable pins (238a) and (238b) may be used to attach and remove the handle portion (112). Examples of brakes (234a) and (234b) are shown on the rear wheels (118a) and (118b) respectively. There is nothing obstructing a self-driving vehicle from driving under the horizontal engagement bar (124).

Figure 3:
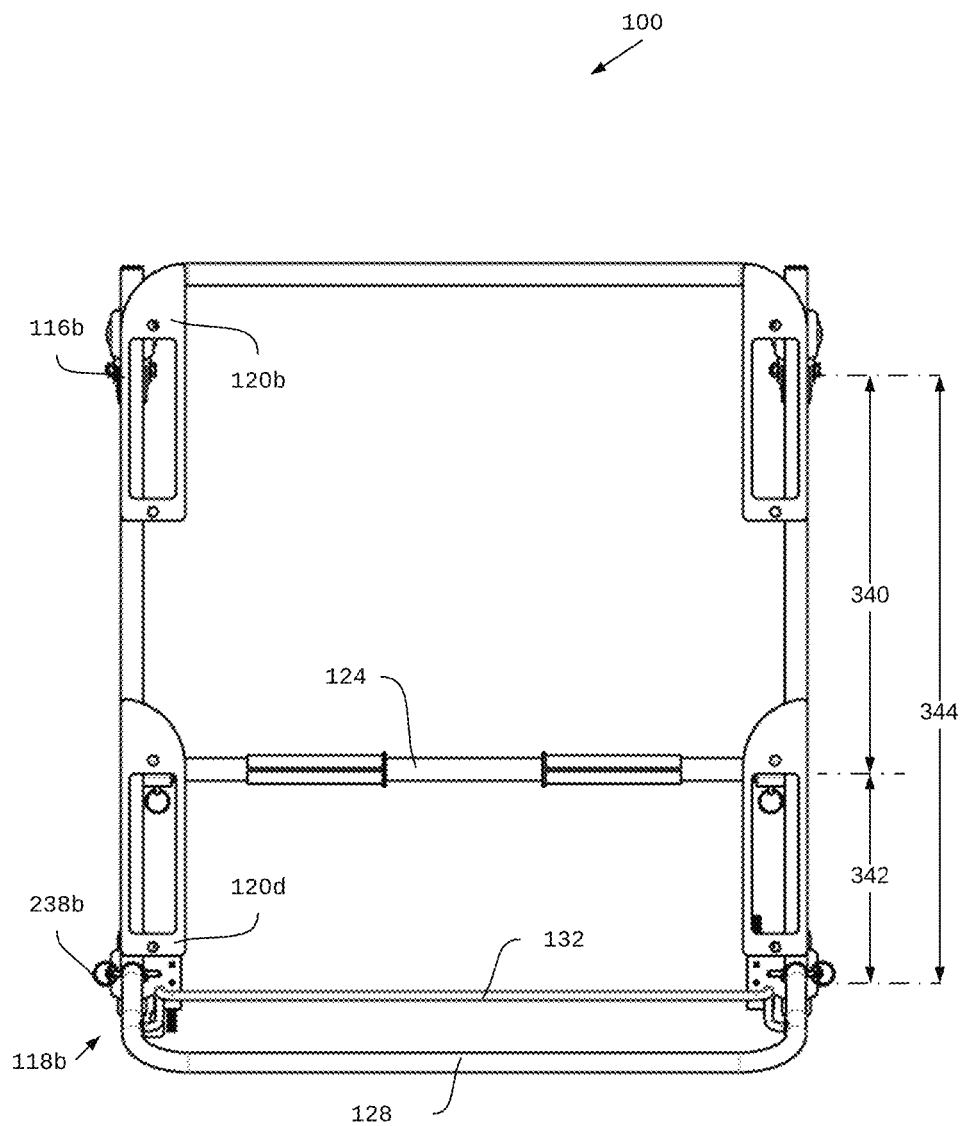
FIG. 3 illustrates the top view of the materials handling cart.

FIG. 3 illustrates the top view of the materials handling cart (100). According to some embodiments, the selection of the location of the horizontal engagement bar (124) (or lift point) may be made according to the distance (340) from the front wheels (116a & 116b) and according to the distance (342) from the rear wheels (118a & 118b). The length (340) from the horizontal engagement bar (124) (or lift point) to the front wheels (116a & 116b), plus the length (342) from the horizontal engagement bar (124) (or lift point) to the rear wheels (118a & 118b) is the total distance (344) between the front wheels and the rear wheels.

Figure 4:
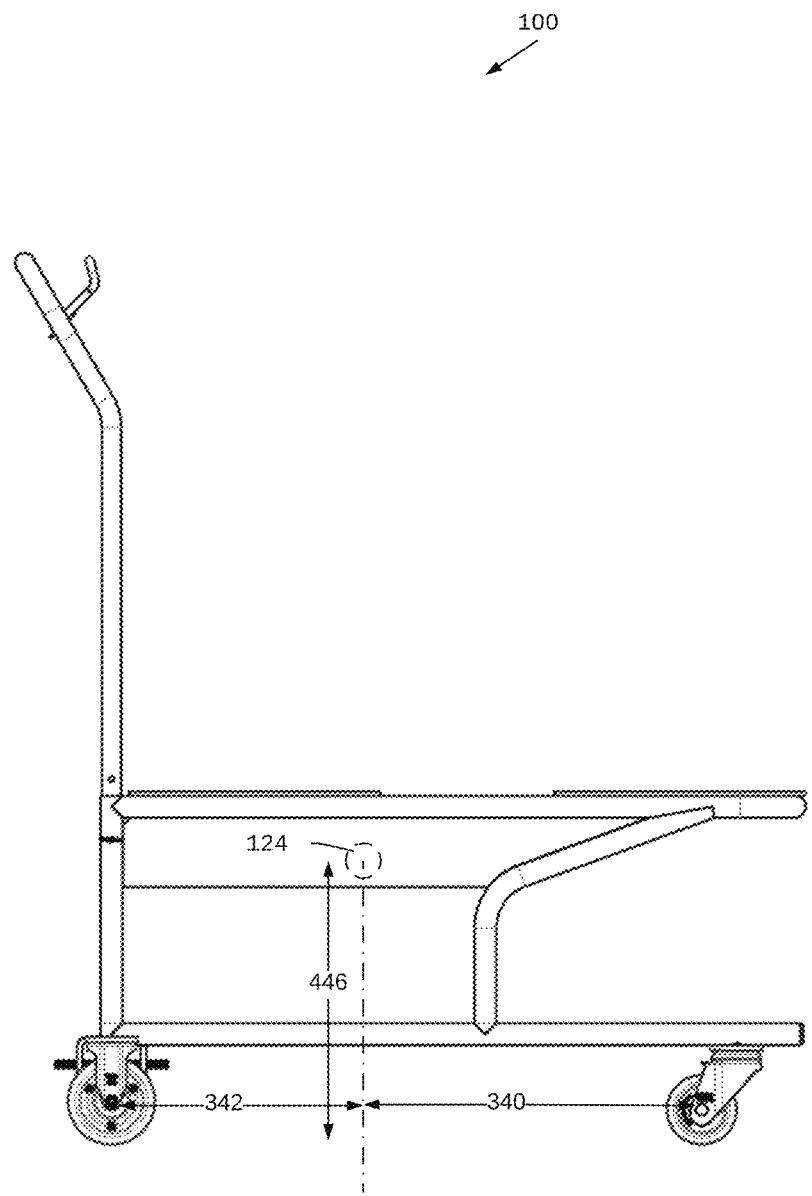
FIG. 4 illustrates the side view of the materials handling cart.

FIG. 4 illustrates the side view of the materials handling cart (100). The height (446) of the horizontal engagement bar (124) (or lift point) is illustrated clearly in the given figure. The length (340) from the horizontal engagement bar (124) (or lift point) to the front wheels (116a & 116b), plus the length (342) from the horizontal engagement bar (124) (or lift point) to the rear wheels (118a & 118b) is also clearly illustrated when seen from the side view of the materials handling cart (100).

Figure 5:
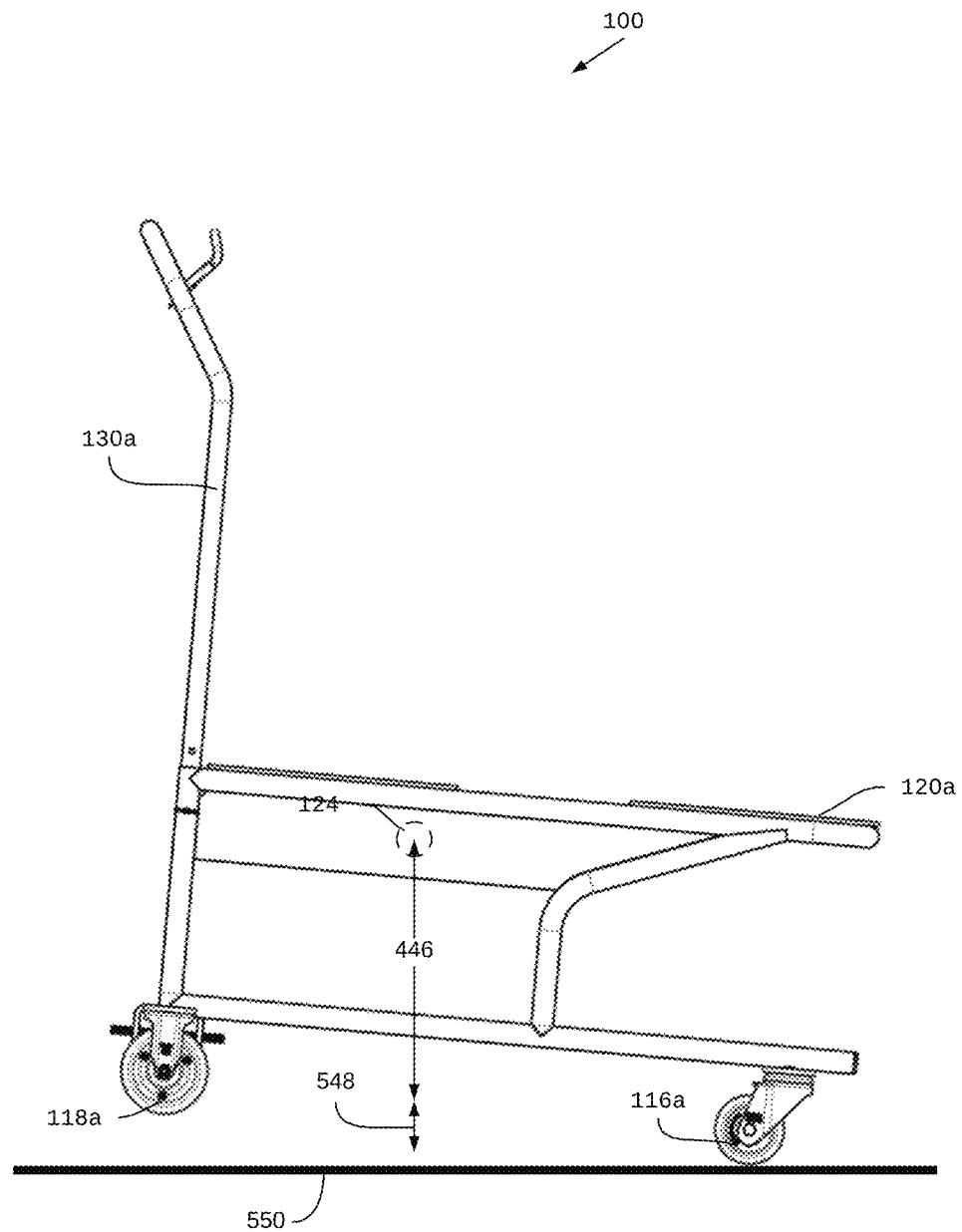
FIG. 5 illustrates the side view of the materials handling cart in lifted or tilted position.

FIG. 5 illustrates the side view of materials handling cart (100) in a position in which the horizontal engagement bar (124) (or lift point) has been lifted or raised by a height (548), for example, as if it has been raised from below by a self-driving vehicle. The selection of the location of the horizontal engagement bar (124) (or lift point) may be made according to the distance (340) and the height (548) to which the horizontal engagement bar (124) (or lift point) may be raised. Raising the horizontal engagement bar (124) (or lift point) causes the payload-bearing surface (122) to be at an angle to the horizontal plane, wherein the angle is approximately expressed by $$\theta = \tan^{-1} \frac{\text{height } ''\#H48''}{\text{length } ''\#E40''}.$$

As the angle increases, it becomes more likely that a payload on the payload-bearing surface (122) may become instable, for example, by sliding off. The dimensions of the cart (100) may be selected so that $\theta \leq 2°$, $\theta \leq 5°$, or $\theta \leq 10°$, in order to ensure that the payload will not slide off.

As shown in FIG. 5, in the lifted position, the front wheel (116a) of the cart is in contact with (supported by) a ground surface (550), and the rear wheel (118a) is lifted off the ground surface (550).

Figure 6:
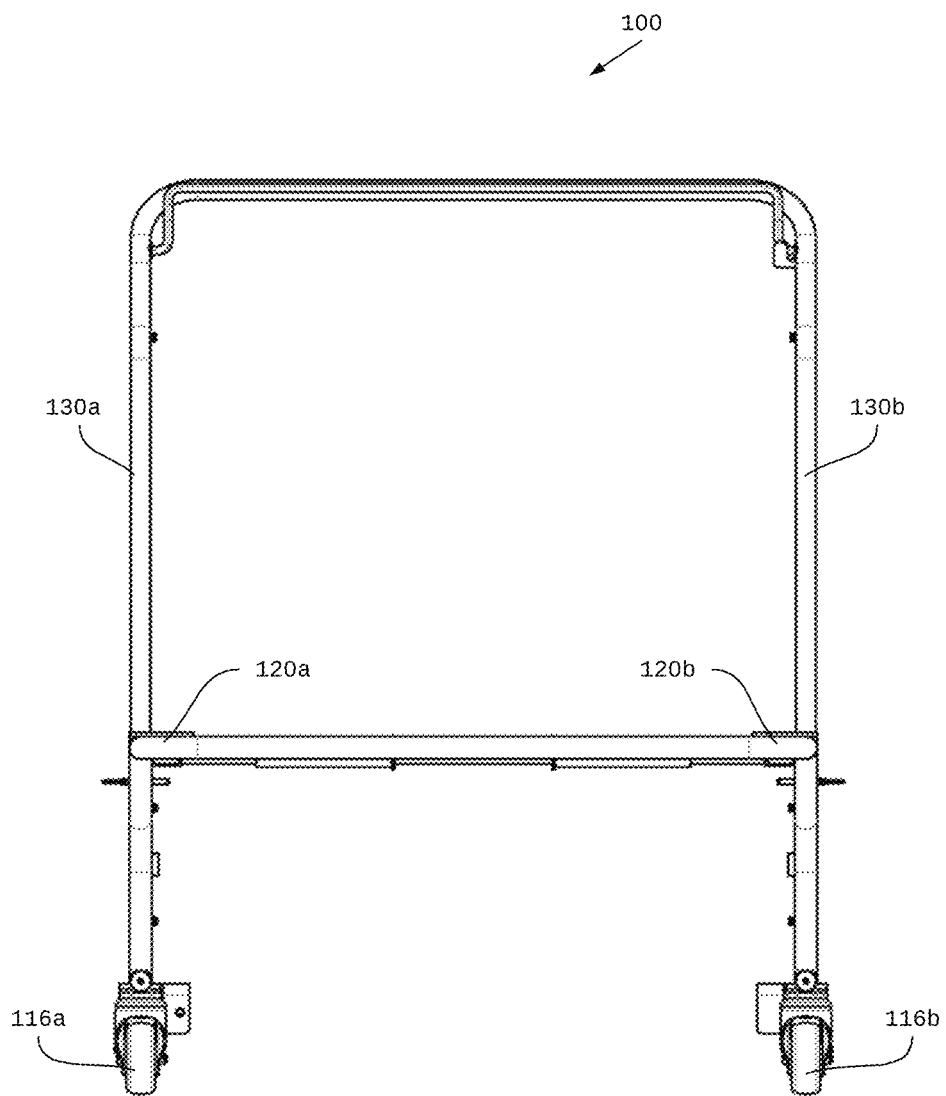
FIG. 6 illustrates the front view of the materials handling cart.

FIG. 6 illustrates the front view of the materials handling cart (100). The dimensions of the cart (100) may be selected so that the weight of the payload is carried at least in part by the front wheels (116a & 116b) such that the self-driving vehicle lifting the cart (100) does not bear, substantially, the entirety of the weight of the payload. This means that the front wheels (116a & 116b) may together bear up to 50%, 30%, or 25% of the weight of the payload. In this way, and according to some embodiments, the self-driving vehicle may transport a payload with a greater mass than may otherwise be possible without the cart (i.e. if the self-driving vehicle were carrying the entire mass itself without the use of the front wheels of the cart on the ground).

Figure 7:
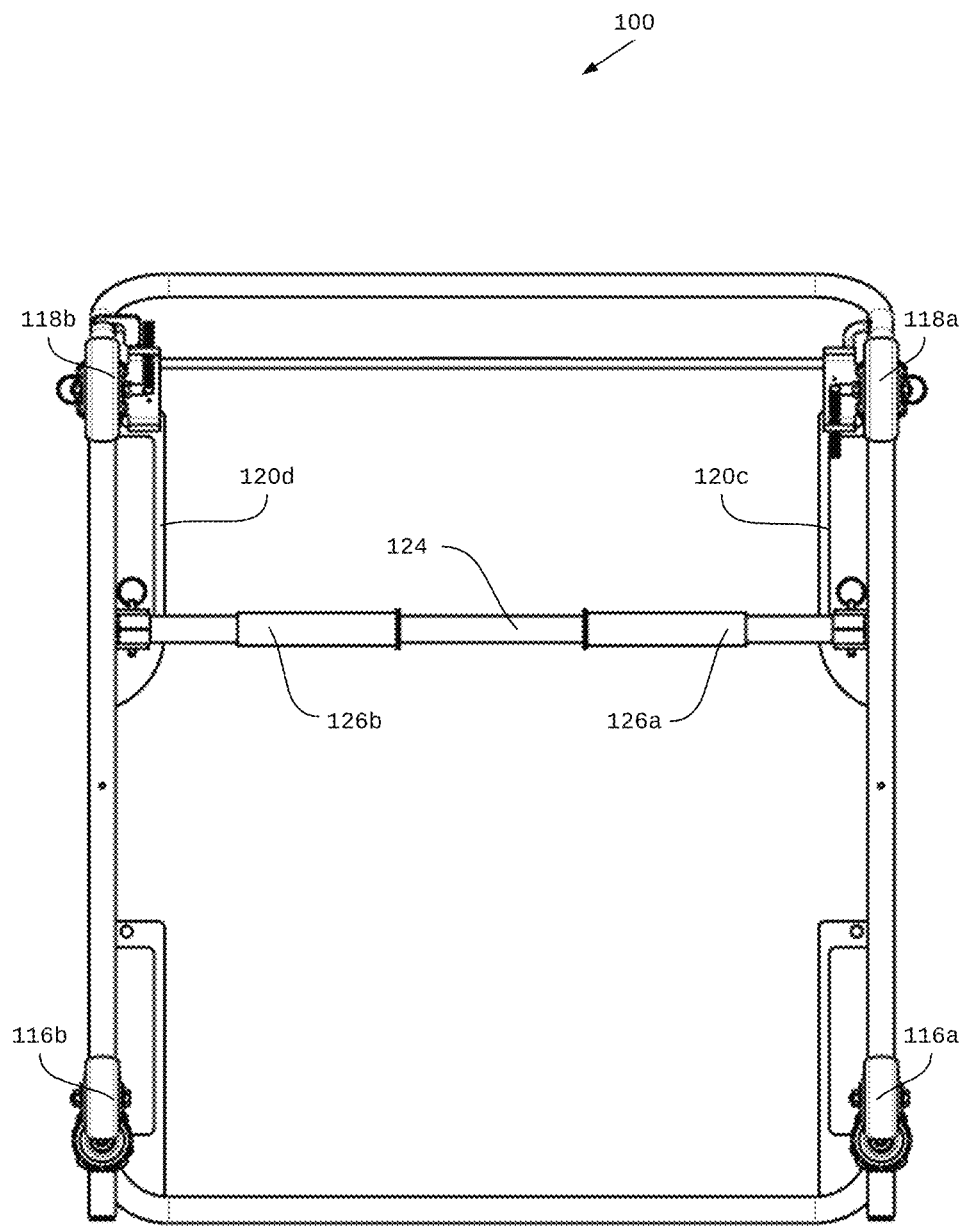
FIG. 7 illustrates the bottom view of the materials handling cart.

FIG. 7 illustrates the bottom view of the materials handling cart (100). The dimensions of the cart (100) may be selected so that the weight of the payload is carried at least in part by the front wheels (116a & 116b) such that the self-driving vehicle lifting the cart (100) does not bear, substantially, the entirety of the weight of the payload. This means that the front wheels (116a & 116b) may together bear up to 50%, 30%, or 25% of the weight of the payload. In the method for transporting materials using a cart, a human operator may move the cart (which may include a payload) starting at a first location. For example, if the cart includes a brake lever, then the human operator actuates the brake lever in order to release the lock on the rear wheels, thereby allowing the cart to be pushed. The human operator may push the cart to a second location. At the second location, the human operator may release the brake lever, thereby engaging the wheel locks (234a & 234b). A self-driving vehicle may then approach the cart, for example, from the rear, such as by detecting the target surfaces (236a-236c). The vehicle may then lift the cart at the horizontal engagement bar (124) so that the rear wheels are off the ground. The vehicle may then transport the cart to a third location. In the event that the cart becomes disengaged from the vehicle while in transit, the cart-engagement attachment may detect that the cart has become disengaged, for example, using the sensors. A signal can then be sent, for example to a fleet-management system, to notify the system and a human operator that the cart has become disengaged.

Figure 8:
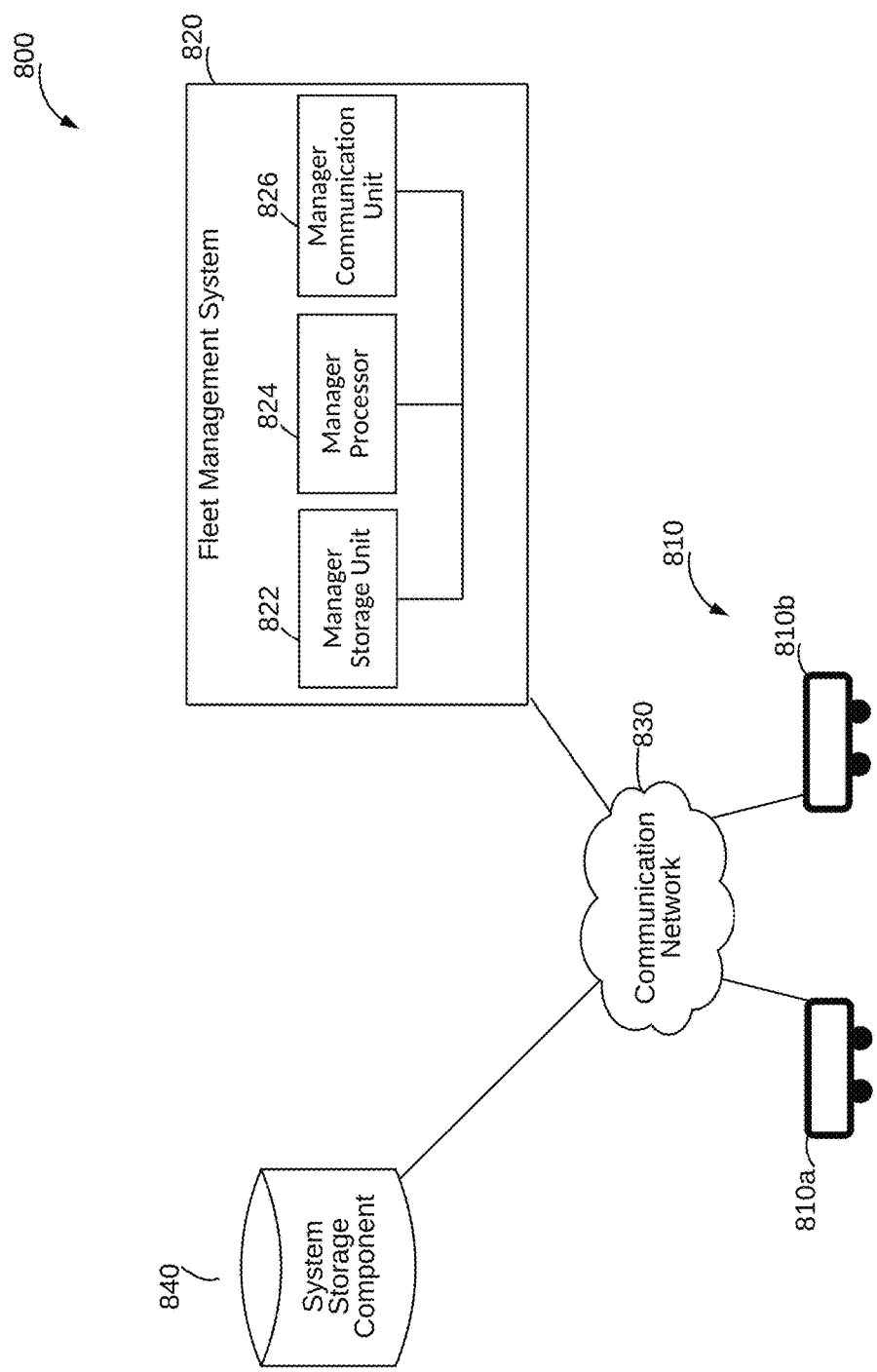
FIG. 8 illustrates the system of one or more self-driving material-transport vehicles.

FIG. 8 illustrates the system of one or more self-driving material-transport vehicles (810a) and (810b), collectively referred to as self-driving material-transport vehicles (810). A system (800) can include one or more self-driving vehicles (810), a fleet management system (820), a communication network (830), and a system storage component (840). Although only two self-driving vehicles (810a and 810b) are shown in FIG. 8, it is possible for the system (800) to include fewer or more self-driving vehicles (810). The fleet management system (820) can delegate missions to the self-driving vehicle (810). The missions can be determined by the fleet management system (820), or received at the fleet management system (820) as input data. As shown in FIG. 8, the fleet management system (820) includes a fleet-manager storage unit (822), a manager processor (824), and a manager communication interface (826). The fleet-manager storage unit (822) can store data in respect of the operation of the communication system (200), such as data in respect of the self-driving vehicles (110d) and the missions being carried out by the self-driving vehicles (110d). For example, the fleet-manager storage unit (822) can store data received from the self-driving vehicles (110d), data in respect of the missions delegated by the fleet management system (120), profile data in respect of each of the self-driving vehicles (110d), an electronic map representing the environment in which the self-driving vehicles (110d) are operating, etc. The fleet-manager storage unit (822) can also store computer programs that are executable by the manager processor (124b) to facilitate communication between the fleet management system (120) and the self-driving vehicles (110d). The fleet-manager storage unit (822) can store data that is more current based on the operation of the fleet management system (120), and the system storage component (140) can store data that is considered by the fleet management system (120) to unlikely be used in the immediate future. For example, the fleet-manager storage unit (822) can store operating data and vehicle profile data only for the self-driving vehicles (110d) operating during a certain day, whereas the system storage component (140) can store the data for all self-driving vehicles (110d) and the electronic map of the environment, which is typically infrequently changed. The fleet-manager storage unit (822) can instead be the system storage component (140), which is accessible via the communication network (130). The manager processor (124b) can control the operation of the fleet management system (120). The manager processor (124b) may be any suitable processors, controllers or digital signal processors that can provide sufficient processing power depending on the configuration, purposes and requirements of the fleet management system (120). The manager processor (124b) can include more than one processor with each processor being configured to perform different dedicated tasks. The manager processor (124b) together with the processor at the self-driving vehicles (110d) contributes to the control of the communication system (200). The manager communication interface (126) facilitates communication between the fleet management system (120) and the other components of the communication system (200), such as the self-driving vehicles (110d) and the system storage component (140) via the communication network (130). The self-driving vehicles (110d) and the fleet management system (120) may communicate via the communication network (130). The communication network (130) may be any network capable of carrying data, including the Internet, Ethernet, plain old telephone service line, public switch telephone network, integrated services digital network, digital subscriber line, coaxial cable, fiber optics, satellite, mobile, wireless, SS7 (Signalling System) signaling network, fixed line, local area network, wide area network, and others, including any combination of these, capable of interfacing with, and enabling communication between the fleet management system (120), the self-driving vehicles (110d) and the system storage component (140). For example, each self-driving vehicle (110d) and the fleet management system (120) may be equipped with a wireless communication interface to enable wireless communications according to a Wi-Fi (Wireless Fidelity) protocol. The communication network (130) may be a local area connection, wide area network and/or cellular network, for example, using a 3G/4G protocol. Similar to the fleet-manager storage unit (822), the system storage component (840) can store information about the self-driving vehicles (810), including operating data, and electronic maps of the environment within which the self-driving vehicles (810) operate. Electronic maps can be stored in the system storage component (840) for subsequent retrieval by the self-driving vehicles (810). The self-driving vehicles (810) can download electronic maps from the system storage component (140) via the communication network (830), for example.

Electronic maps can be generated for the environment of the self-driving vehicles (810). For example, a CAD (Computer Aided Design) file representing the environment of the self-driving vehicles (810) can be imported and form the basis for an electronic map. In another example, the fleet management system (820) can generate the electronic map based on data collected by the self-driving vehicles (810). Operating data can be stored in the system storage component (840), and the operating data can be retrieved by the fleet management system (820) when needed. The fleet management system (820) can download the operating data from the system storage component (840) via the communication network (830). Example of operating data can include, but not limited to, a current position of the self-driving vehicles (810), current velocities of the self-driving vehicles (810), an estimated position for the self-driving vehicles (810) at a subsequent time, an estimated completion time of a current mission of the self-driving vehicles (810), and estimated remaining battery lifetime of the self-driving vehicles (810). The operating data, or at least some of the operating data, can be stored in the fleet-manager storage unit (822). The fleet-management system (820) and any or all of the individual fleet-manager storage unit (822), the manager processor (824), the manager communication interface (826), can reside on one or more of the self-driving vehicles (810).

Figure 9:
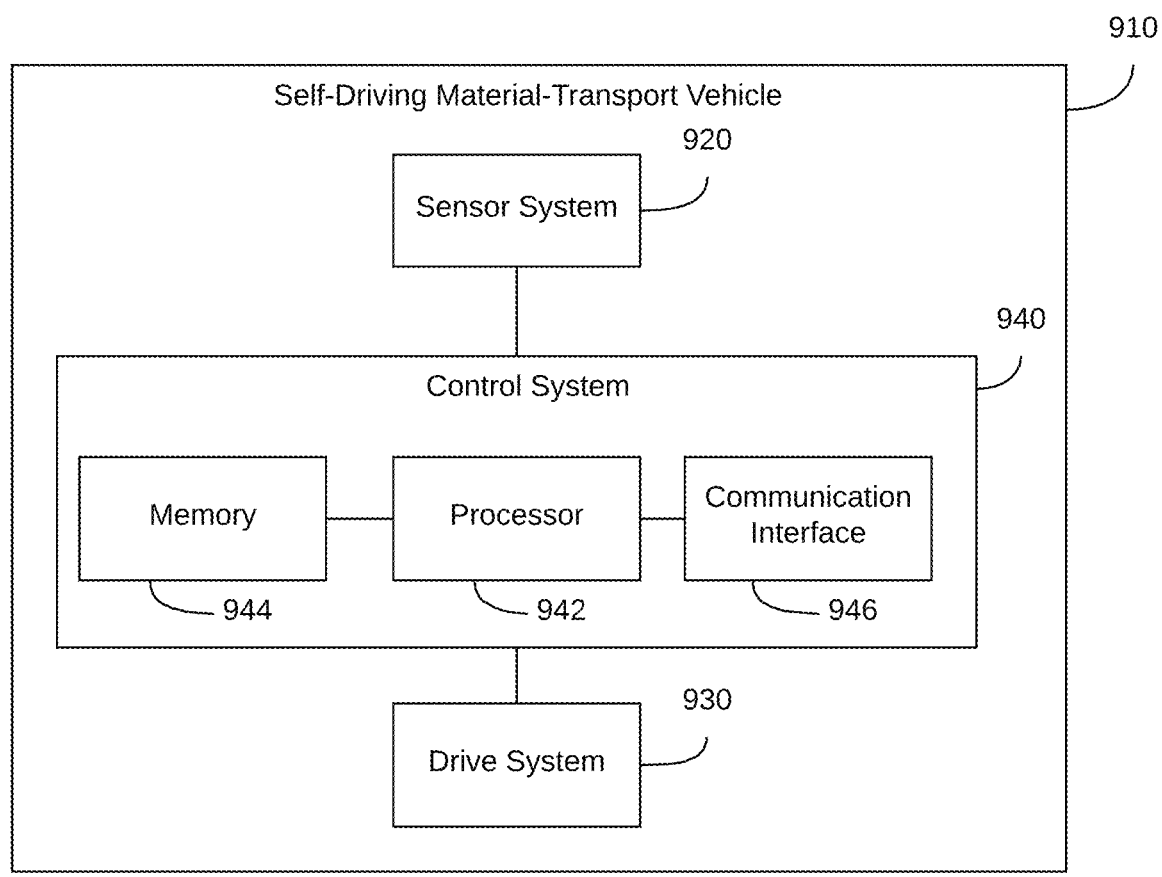
FIG. 9 illustrates the block diagram of a self-driving material-transport vehicle.

FIG. 9 illustrates the block diagram of self-driving material-transport vehicle (910). The self-driving vehicle (910) includes a sensor system (920), a control system (940) and a drive system (230). The sensor system (920) can include one or more sensors for collecting data from the environment of the self-driving vehicle (910). For example, the sensor system (920) can include a LiDAR (Light Detection and Ranging) device (or other optical, sonar, or radar-based range-finding devices operating on known principles such as time-of-flight). The sensor system (920) can include optical sensors, such as video cameras and systems (e.g., stereo vision, structured light). The control system (940) can include a processor (922), a memory (or storage unit) (924), and a communication interface (926). The control system (940) facilitates the operation of the self-driving vehicle (910). The control system (940) can store an electronic map that represents the environment of the self-driving vehicle (910), such as a facility, in the memory (924). The processor (922) can include any suitable processors, controllers or digital signal processors that can provide sufficient processing power depending on the configuration, purposes and requirements of the self-driving vehicle (910). In some embodiments, the processor (922) can include more than one processor with each processor being configured to perform different dedicated tasks. The memory (924) can store data to be used during the operation of the self-driving vehicle (910) and to facilitate the operation of the self-driving vehicle (910). Example data can include operating data in respect of its operation, the electronic map representing its environment, data in respect of one or more other self-driving vehicles (910), data in respect of its mission, etc. The memory (924) can store software applications executable by the processor (922). For example, the software application includes image processing applications that facilitate image data collection by the self-driving vehicle (910). The communication interface (926) can include any component for facilitating communication with the other components of the system (800) via the communication network (830). For example, the communication interface (926) can include a wireless transceiver for communicating within a wireless communications network. The self-driving vehicle (910) can receive a mission from the fleet management system (820) or an external system. The mission received from the fleet management system (820) can include one or more waypoints or destination locations. Based on the received mission, the control system (940) can determine a path for the self-driving vehicle (910) to navigate to the waypoint or destination location with minimal, if any, instructions from another system or the users. The control system (940) and the sensor system (920) can navigate the self-driving vehicle (910) without any additional navigational aids (e.g., navigational targets, magnetic strips, or paint/tape traces) installed in the environment. For example, the control system (940) can generate a path for the self-driving vehicle (910) to a destination location based on the location of the self-driving vehicle (910). The control system (940) can then operate the drive system (930) to direct the self-driving vehicle (910) along the planned path. As the self-driving vehicle (910) travels along the planned path, the sensor system (920) can collect data from the environment. The collected data can assist the control system (940) to track the progress of the self-driving vehicle (910) along the planned path and also to update a location of the self-driving vehicle (910) within the environment. Example of data collected by the sensor system (920) can include images of the environment. At least with the data collected by the sensor system (920), the control system (940) can determine when an unexpected obstacle is in the planned path, and modify the planned path to navigate around the obstacle. The self-driving vehicle (910) can be equipped with one or more end effectors for facilitating interaction with objects within the environment. Example of end effectors can include a gripper, a clamp, a shovel, a broom, a vacuum, a rotating spindle, or any other tools. The operation of the end effectors can be controlled by the control system (940). The self-driving vehicle (910) can operate in environments with varied terrains and regulated zones that require environmental qualifications. Example of regulated zones can include sterile environments, and temperature-controlled environments (e.g., high or low temperature environments). The self-driving vehicle (910) can be configured to comply with the requirements of the various terrains and/or zones within its environment. For example, a self-driving vehicle (910) can be sterilized to operate in a sterile environment and subsequently only operate within the boundaries of the sterile environment in order to maintain its qualification. Self-driving vehicles (910) may undergo environmental testing or include higher rated components to meet other environmental qualifications.

Figure 10:
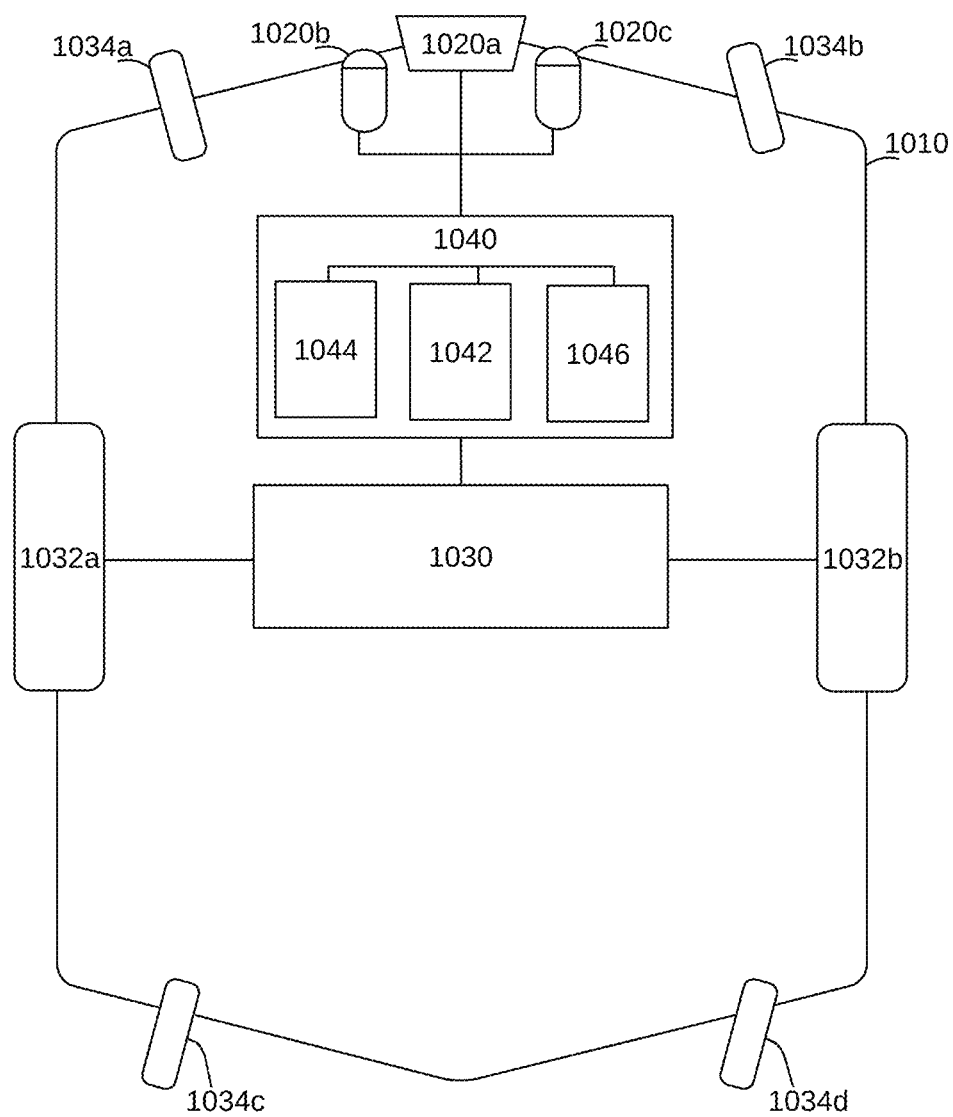
FIG. 10 illustrates the block diagram of an example of a self-driving material-transport vehicle.

FIG. 10 illustrates the block diagram of an example of a self-driving material-transport vehicle (1010). The self-driving vehicle (1010) acts as a self-driving material-transport vehicle (1010) for transporting objects between different locations. The self-driving material-transport vehicle (1010) can include a cargo component for carrying loads. For example, the cargo component can be a flatbed or a bucket having sidewalls to prevent loads from falling out as the self-driving material-transport vehicle (1010) moves. The self-driving material-transport vehicle (1010) can include cargo securing mechanisms to secure the load and prevent the load from falling off the self-driving material-transport vehicle (1010). Although the self-driving vehicle (1010) can act as a self-driving material-transport vehicle, the self-driving vehicle (1010) is not limited to transporting objects. Similar to the self-driving vehicle (910) of FIG. 9, the self-driving vehicle (1010) includes a drive system (1030), a sensor system (1020) and a control system (1040). The drive system (1030) includes a motor and/or brakes connected to drive wheels (1032*a*) and (1032*b*) for driving the self-driving material-transport vehicle (1010). The motor can be, but is not limited to, an electric motor, a combustion engine, or a combination/hybrid thereof. Depending on the application of the self-driving vehicle (1010), the drive system (1030) may also include control interfaces that can be used for controlling the drive system (1030). For example, the drive system (1030) may be controlled to drive the drive wheel (1032*a*) at a different speed than the drive wheel (1032*b*) in order to turn the self-driving material-transport vehicle (1010). The number of wheels (1034) may be included. The self-driving vehicle (1010) includes wheels (1034*a*), (1034*b*), (1034*c*), and (1034*d*). The wheels (1034*a*-1034*d*) may be wheels that are capable of allowing the self-driving material-transport vehicle (1010) to turn, such as castors, omni-directional wheels, and mecanum wheels. The sensor system (1020) as shown in FIG. 10 includes example sensors (1020*a*, 1020*b*, and 1020*c*). The sensors (1020*a*), (1020*b*), (1020*c*) are optical sensors arranged to provide three-dimensional imaging. The positions of the components (1034), (1020), (1040), (1030) & (1032) of the self-driving material-transport vehicle (1010) are shown for illustrative purposes and are not limited to the illustrated positions. Other configurations of the components (1034), (1020), (1040), (1030) & (1032) can be used depending on the application of the self-driving material-transport vehicle (1010) and the environment in which the self-driving material-transport vehicle (1010) will be used.

Figure 11:
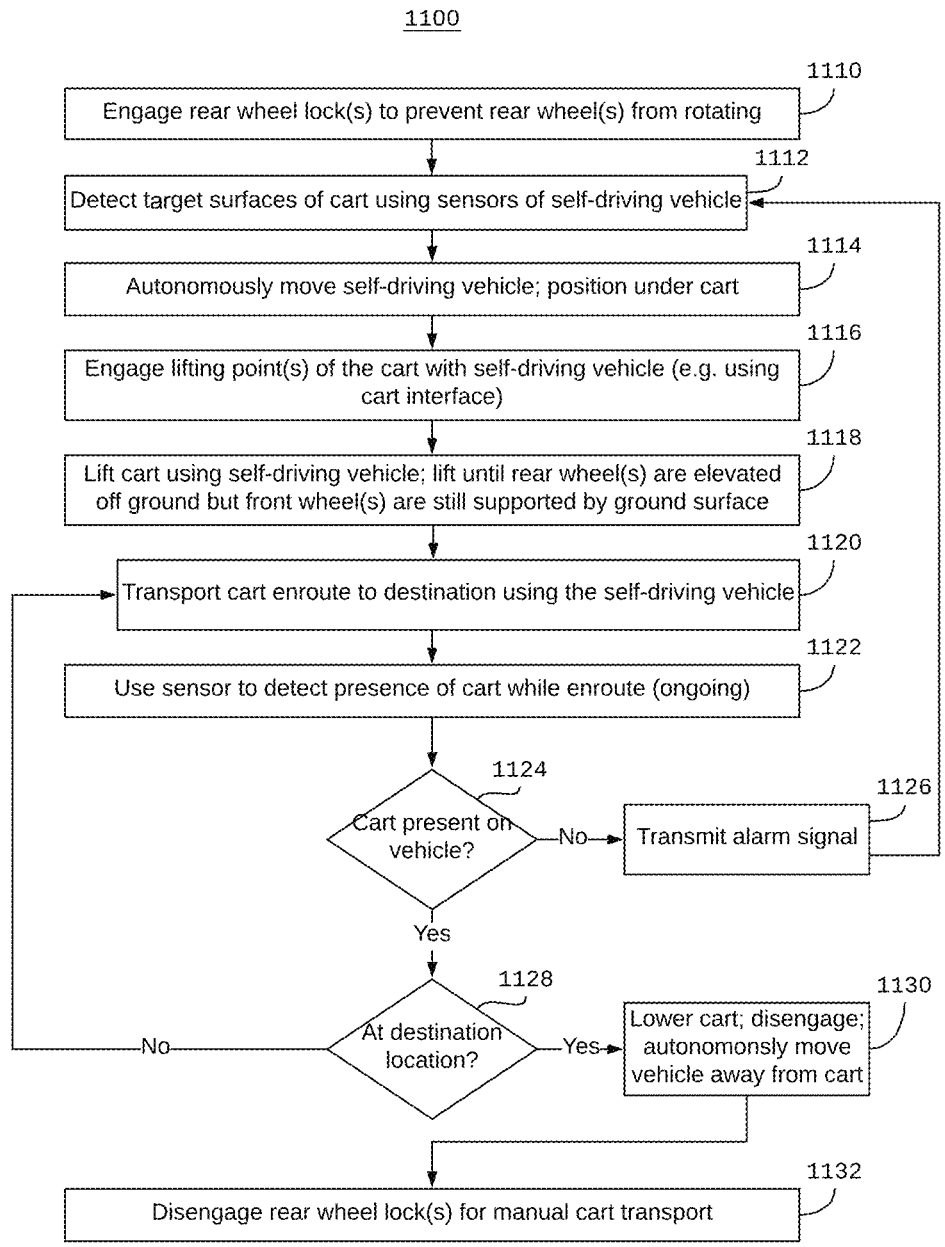
FIG. 11 illustrates the method of using a self-driving vehicle to transport a cart.

FIG. 11 illustrates the method (1100) of using a self-driving vehicle to transport a cart (100). The method 1100 may be executed using the self-driving vehicle. According to some embodiments, the self-driving vehicle may comprise a non-volatile, computer-readable medium (e.g. as a part of the control system), which may store computer instruction code that, when executed by a processor (e.g. as a part of the control system), cause the processor to execute some or all of the steps of a method for using a self-driving vehicle to transport a cart, according to some embodiments.

The method 1100 may begin at step 1110 when one or more rear wheel locks are engaged to lock one or more rear wheels, thereby preventing the rear wheels from rotating. According to some embodiments, the rear wheel locks may be engaged by a human operator, for example, when the human operator transports the cart and leaves it at a location at which it may be picked up by a self-driving vehicle. According to some embodiments, the wheel locks may be actuated by a break lever. According to some embodiments, the wheel locks may be engaged when the break lever is in a released position (e.g. the break lever may be biased to engage the wheel locks). In other words, when the cart is not being operated by a human operator (e.g. when the brake lever is released), the wheel locks may be automatically engaged.

At step 1112, when the self-driving vehicle is within vicinity of the cart (e.g. which may be determined based on the range of the vehicle's sensors), the sensors of the self-driving vehicle can be used to detect the cart. According to some embodiments, the cart may comprise one or more target surfaces, and the sensors may be used to detect the target surfaces. As such, the self-driving vehicle can identify the cart and determine the cart's position and orientation relative to the self-driving vehicle.

At step 1114, the self-driving vehicle autonomously moves in order to position itself under the cart. According to some embodiments, this is based on the identification of the cart in the previous step. The vehicle may position itself relative to the cart, such as by aligning itself in the direction of the cart, driving under the cart from behind the cart, and aligning the cart (e.g. aligning a cart interface on the vehicle) with a lift point on the cart.

At step 1116, the lifting point(s) of the cart are engaged with the vehicle. According to some embodiments, the vehicle may include a cart interface designed to complement (or otherwise engage with) one or more lifting points (e.g. horizontal bars) of the cart. The vehicle may engage with the cart by raising the top of the cart (using a built-in elevator/lift of the cart, or an elevator/lift attached to the cart). According to some embodiments, proximity sensors in the vehicle (and/or in the cart interface) may detect the cart, thereby confirming that the cart has been engaged with the vehicle. The proximity sensors can be capacitive sensors and/or inductive sensors.

At step 1118, the self-driving vehicle lifts the cart using the elevator/lift as previously described. The cart is lifted until the rear wheels are elevated off the ground, but not until the front wheels are off the ground. In other words: the rear wheels are lifted off the ground surface, and the front wheels remain supported by the ground surface. According to some embodiments, the cart is lifted until the payload-bearing surface is at an appropriate or pre-determined angle as previously described.

At step 1120, the self-driving vehicle transports the cart enroute to a destination location. Generally, this includes to the self-driving vehicle planning and executing a path to the destination, which may have been provided to the vehicle, for example, by a fleet-management system. Since the rear wheels are off the ground surface (and locked), and the front wheels are able to be steered (e.g. are castors), the vehicle may move while engaged with the cart.

At step 1122, the sensors (e.g. proximity sensors) of the vehicle are used to detect the presence of the cart. Generally, step 1122 may be executed any time after step 1114, and may be executed concurrently or intermittently with any of the steps. In other words, step 1122 and/or step 1124 may be executed on an ongoing basis after the vehicle engages with the cart.

If the sensors do not detect the presence of the cart, then the method proceeds to step 1126. Generally, it can be assumed that in this case, the cart has become disengaged with the vehicle, and is no longer being transported by the vehicle or is not being transported properly or safely. In this case, the method proceeds to step 1126, and an alarm signal is transmitted by the vehicle. The alarm signal may be transmitted in one or more ways. For example, the vehicle may use a speaker to sound an alarm signal that can notify any human operators within vicinity of the alarm sound. The vehicle may transmit an electronic signal to a fleet-management system (or other computer system), which may then communicate with computer terminals in order to provide visual notification to human operators that the cart has become disengaged. According to some embodiments, the alarm signal may include location information pertaining to location of the self-driving vehicle and/or the last-known location of the vehicle when the cart was engaged.

According to some embodiments, human intervention may be required in order to confirm that the cart (and/or its contents) have not been damaged or lost, and/or to reengage the cart with the vehicle. Generally, this action may be prompted by the alarm signal. According to some embodiments, the vehicle may automatically attempt to re-engage the cart. For example, the method may return to step 1112 so that the vehicle can re-engage the cart.

If, at step 1122, the sensor detects the presence of the cart, then the method proceeds to step 1128. If, at step 1128, the vehicle and cart are not yet at the destination location, then the method returns to step 1120 and the vehicle continues to transport the cart enroute to the destination location.

If, at step 1128, the vehicle and cart are at the destination location, then the method proceeds to step 1130. At step 1130, the vehicle lowers the cart such that the rear wheels of the cart are supported by the ground surface. The vehicle then lowers the elevator/lift, or otherwise disengages with the cart, and then moves away from the cart. For example, and in reference to step 1114 above, if the vehicle drove under the cart from behind the cart in order to position itself under the cart, then, during step 1128, the vehicle may reverse out from under the cart. The vehicle may then be dispatched for another mission.

At step 1132 the rear wheel locks may be disengaged for manual cart transport. For example, and in reference to step 1110 above, a human user may disengage the wheel locks in order to move the cart without the use of the self-driving vehicle.

According to some embodiments, references to "rear" and "front" may be substituted for each other. For example, the front wheels of the cart may be locked (and unlocked); and the lifting point(s) of the cart and/or the cart engagement may be designed so that the front (i.e. equipped with locks) wheels are lifted while the rear wheels remain in contact with the ground.

As mentioned, there remains the foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood, however, that even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

We claim:

1. A system for transporting objects, the system comprising:
    a cart, the cart comprising:
    a chassis portion supporting a payload to be moved by the cart, characterized in that, the chassis portion comprises of:
        a first side rail; and
        a second side rail;
    a first front wheel and a first rear wheel attached to the first side rail;
    a second front wheel and a second rear wheel attached to the second rail;
    a handle portion pushing the cart, characterized in that, the handle portion comprises of:
        a handle bar supported by one or more vertical support members; and
        a brake actuator engaging and releasing the brakes on the rear wheel;
    a horizontal engagement bar;
    a payload-bearing surface bearing payload such that the payload can be transported by the cart; and
    a self-driving vehicle for engaging with and transporting the cart such that, when the self-driving vehicle is transporting the cart, the first and second front wheels are engaged on a ground surface and the first and second rear wheels are not engaged on the ground surface.

2. The system as claimed in claim 1, wherein the chassis portion allows the self-driving vehicle to engage with the cart.

3. The system as claimed in claim 1, wherein the first side rail and second side rail comprises of two or more wheels.

4. The system as claimed in claim 1, wherein the first and second front wheels comprise castors that allow the front of the cart to pivot and turn.

5. The system as claimed in claim 1, wherein the first and second rear wheels comprise a locking mechanism for fixing the angular position of the wheels.

6. The system as claimed in claim 1, wherein the chassis portion comprises a plurality of supporting surfaces.

7. The system as claimed in claim 1, wherein the horizontal engagement bar comprises a plurality of engagement pads.

8. The system as claimed in claim 1, wherein the cart is made using steel tubing.

9. The system as claimed in claim 1, wherein the handle portion is removable in order to allow for a plurality of carts to be stacked or nested.

10. The system as claimed in claim 1, wherein the engagement pads are selected such that they are complementary with a cart interface on a self-driving vehicle.

11. The system as claimed in claim 1, wherein the cart comprises a plurality of target surfaces which are selected to have optical qualities making the target surfaces easily detectable by a LiDAR device or any optical range finding sensor.

12. The system as claimed in claim 1, wherein the handle portion is attachable and removable using removable pins.

13. The system as claimed in claim 1, wherein the horizontal engagement bar location selection can be made according to the distance from the front wheels and distance from the rear wheels.

14. The system as claimed in claim 1, wherein the horizontal engagement bar location selection can be made according to the height to which the horizontal engagement bar lifted from a ground surface.

15. The system as claimed in claim 1, wherein the cart dimensions are selected in order to ensure that the payload will not slide off.

16. The system as claimed in claim 1, wherein the cart is adapted to be drivable by human action.

17. The system as claimed in claim 1, wherein the self-driving vehicle is equipped with a lift and a cart-engagement interface.

18. The system as claimed in claim 17, wherein the lift enables the vehicle to lift the cart at a lift point, such that the rear wheels are lifted off the ground and the front wheels are not lifted off the ground.

19. The system as claimed in claim 1, wherein the self-driving vehicle comprises one or more proximity sensors.

20. The system as claimed in claim 19, wherein the proximity sensors are activated when engaging at least one lifting point of the cart.

21. The system as claimed in claim 19, wherein the proximity sensors are at least one of capacitive and inductive sensors.

22. The system as claimed in claim 11, wherein the plurality of target surfaces on the cart comprise surfaces associated with at least one of the horizontal engagement bar or the one or more vertical support members.

23. The system as claimed in claim 11, wherein the self-driving vehicle is equipped with an optical range finding sensor.

24. The system as claimed in claim 23, wherein the optical range finding sensor is used by the self-driving vehicle to detect one or more of the plurality of target surfaces on the cart.

* * * * *